(No Model.)
J. C. HEGELEIN.
CAMERA SHUTTER.
No. 524,143. Patented Aug. 7, 1894.
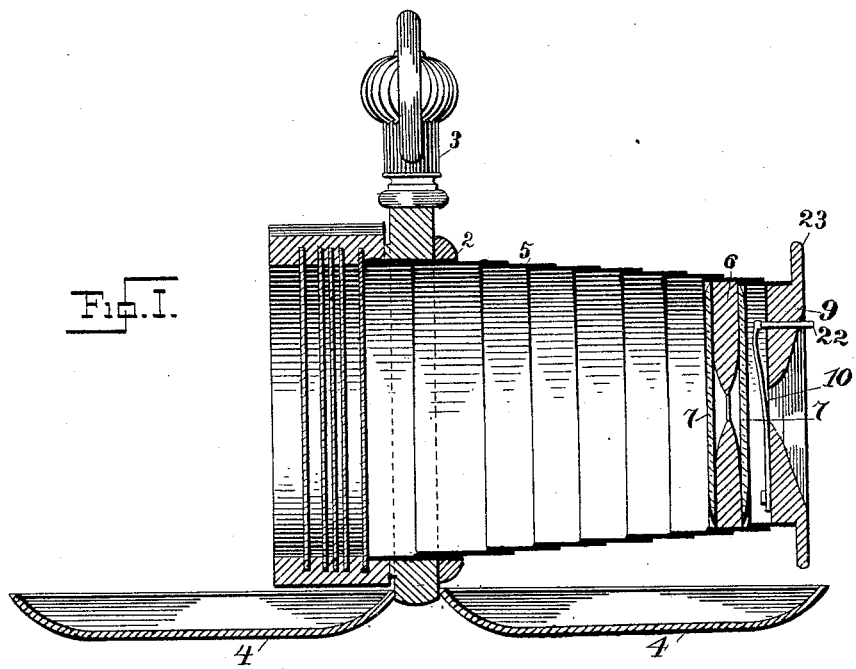
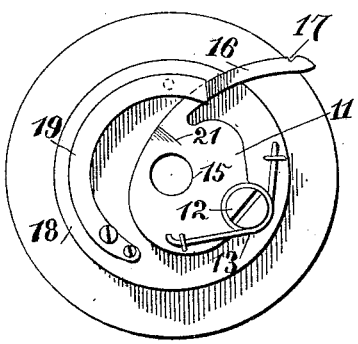
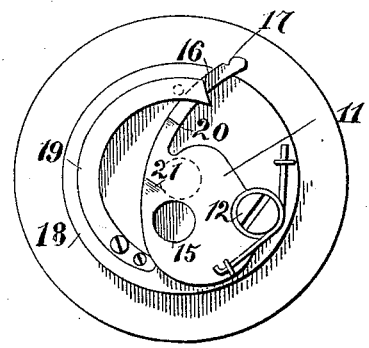
Witnesses
Geo W Naylor Jr.
M. V. Bidgood
Inventor
John C. Hegelein
By ———
Attys.

UNITED STATES PATENT OFFICE.

JOHN C. HEGELEIN, OF NEW YORK, N. Y.

CAMERA-SHUTTER.

SPECIFICATION forming part of Letters Patent No. 524,143, dated August 7, 1894.

Original application filed December 2, 1893, Serial No. 492,591. Divided and this application filed March 20, 1894. Serial No. 504,370. (No model.)

*To all whom it may concern:*

Be it known that I, JOHN C. HEGELEIN, a citizen of the United States, residing in the city, county, and State of New York, have invented certain new and useful Improvements in Camera-Shutters, of which the following is a specification.

The present application is a division of my application, Serial No. 492,591, filed December 2, 1893, and relates to a shutter especially intended for a photographic camera, the description of which is set out and particularly claimed in the said application. The said application describes a camera adapted to go into the vest pocket and preferably made so as to be capable of shutting up in an ordinary watch case. The small compass of the instrument requires that all of its parts including the shutter and its operating mechanism should be on a small scale and therefore simplicity of construction is essential. My device is therefore constructed with a view to taking up as little space as possible.

Referring to the accompanying drawings which form a part of this specification:—Figure I is a sectional view of a camera of the kind to which my invention is particularly applicable. The shutter is omitted from this section. Figs. II and III are face views of the inside of the front plate of the camera showing the shutter in two positions. In Fig. II the shutter is in position for making a time exposure, while in Fig. III the shutter is closed.

The camera I have described in my former application is made up of telescoping sections 5 which fit in a watch case 2, 3, 4; 2 being the center and bezel, 3 the pendant and 4 the covers.

In the smallest of the telescopic rings 5 is placed the front plate 9 which has the usual opening 10 at center and back of it the diaphragm 6 with lenses 7, 7, one on each side.

Hinged to the front plate 9 by screw 12 is the shutter 11 which is preferably of the represented fan-shape with an aperture 15 at center and a spring 13 fixed to the front plate 9 at one end and to the shutter 11 at the other end and wound on the screw 12 intermediately.

Integral with the shutter 11 is an arm 16 notched at 17 for the thumb nail and at 20, 21 to receive the end of a spring 19 fixed to the front plate. The spring may be pressed inward to release the arm 16 of the shutter by means of a pin 22 which passes through the front plate.

The parts, it will be seen, are so constructed that they are exceedingly flat and add very slightly to the thickness of the front plate.

The plate spring 19 is arcuate so as to give considerable flexibility while taking up little space diametrically. The notch 20 with which the spring 19 is shown in engagement in Fig. II allows for time exposures while the notch 21 permits instantaneous exposures.

Fig. II shows the shutter in position for making a time exposure. In this position the end of the spring 19 is in engagement with the notch 20 (shown exposed to view in Fig. III). The exposure is terminated by pressing in the pin 22 allowing the shutter to assume the position shown in Fig. III. When an instantaneous exposure is desired the shutter is drawn farther out so that the end of spring 19 engages in the notch 21 and on pressing the pin 22, an instantaneous exposure is then made by the passage of the aperture 14 of the shutter over aperture 10 of the front plate 9 of the camera.

Having thus described my invention, the following is what I claim as new therein and desire to secure by Letters Patent:

1. In a camera shutter, the combination of the front plate 9, the fan-shaped shutter plate 11 pivoted to said front plate and having integral therewith an arm 16, provided with notches 20, 21, a spring adapted to engage said notches and a pin 22 seated in said front plate and adapted to operate said spring, substantially as set forth.

2. In a camera shutter, the combination of the front plate 9, the fan-shaped shutter 11 pivoted thereto and having notched arm 16 and the plate spring 19 fixed to the front plate and bearing against said arm 16, and adapted to engage in the notches therein substantially as and for the purposes set forth.

3. In a camera shutter, the combination of the front plate 9, the fan-shaped shutter 11 pivoted thereto and having aperture 14 spring 13 and arm 16 having notches to engage said spring and the arcuate plate spring 19 fixed to said front plate and bearing against said arm, substantially as and for the purposes set forth.

JOHN C. HEGELEIN.

Witnesses:
M. V. BIDGOOD,
C. M. OTT.